No. 676,699. Patented June 18, 1901.
A. ROEMISCH.
APPARATUS FOR SEVERING ARTICLES OF GLASSWARE.
(Application filed Jan. 9, 1901.)
(No Model.) 2 Sheets—Sheet 1.
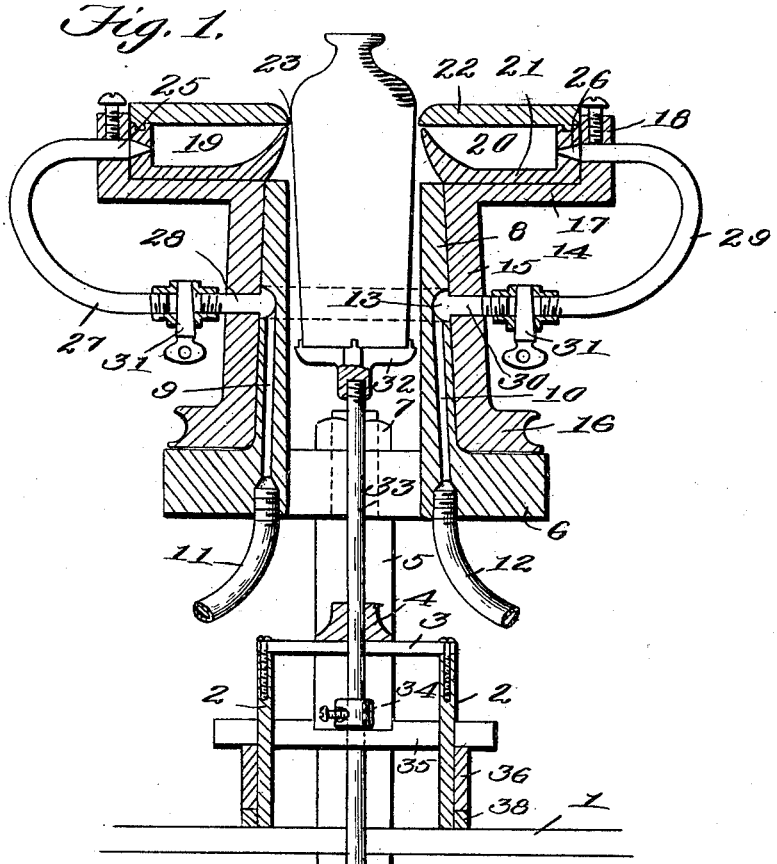
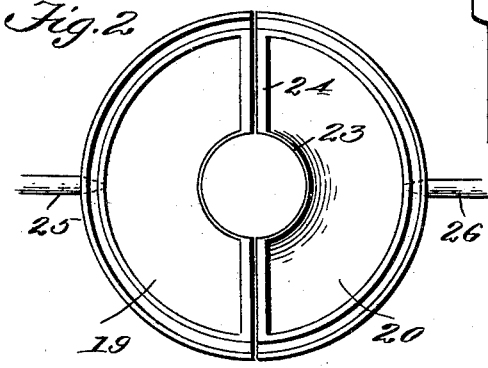
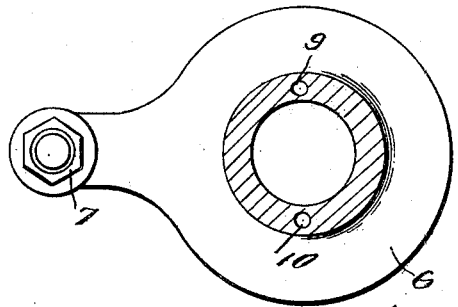
Witnesses:
Inventor
Anton Roemisch
By James L. Norris
Atty
THE NORRIS PETERS CO., PHOTO-LITHO., WASHINGTON, D. C.

No. 676,699. Patented June 18, 1901.
A. ROEMISCH.
APPARATUS FOR SEVERING ARTICLES OF GLASSWARE.
(Application filed Jan. 9, 1901.)
(No Model.) 2 Sheets—Sheet 2.
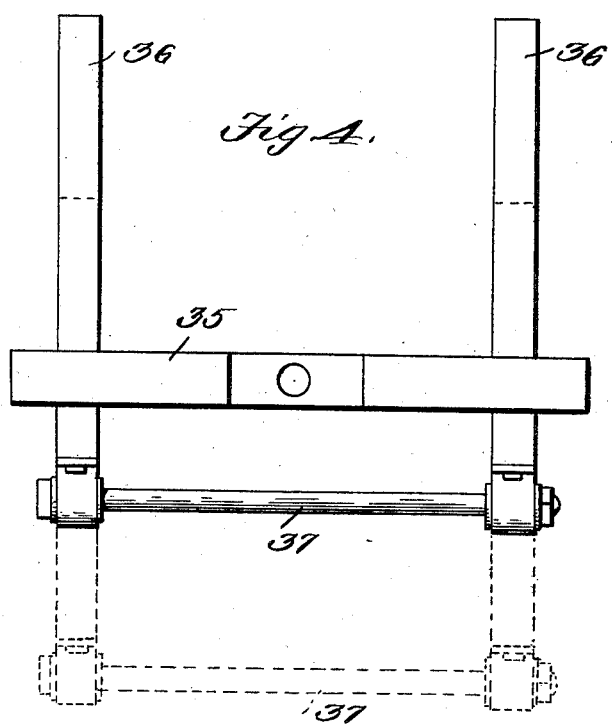
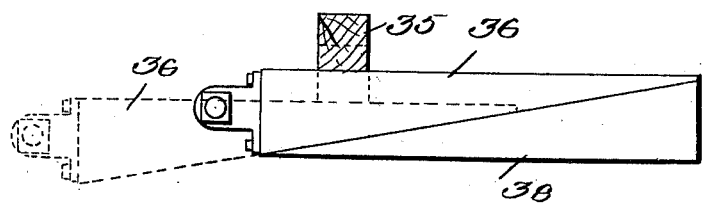
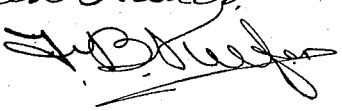
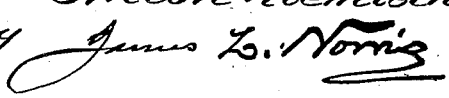

UNITED STATES PATENT OFFICE.

ANTON ROEMISCH, OF MORGANTOWN, WEST VIRGINIA.

APPARATUS FOR SEVERING ARTICLES OF GLASSWARE.

SPECIFICATION forming part of Letters Patent No. 676,699, dated June 18, 1901.

Application filed January 9, 1901. Serial No. 42,682. (No model.)

*To all whom it may concern:*

Be it known that I, ANTON ROEMISCH, a citizen of the United States, residing at Morgantown, in the county of Monongalia and State of West Virginia, have invented new and useful Improvements in Apparatus for Severing Articles of Glassware, of which the following is a specification.

In the manufacture of blown-glass articles, such as tumblers and the like, there is always left at one end of the article a nib or projection which is formed by the blowpipe or tube, and this projection has to be removed in order to complete the article. A common method of severing the projecting upper end of a tumbler or other glass article from the body thereof is to apply the tumbler to a rotating chuck and draw around the outer surface of the glass along the line at which the same is to be severed a fine wire, the friction between the tumbler and the wire creating sufficient heat to crack the same. This means of severing the glass is objectionable, both because of the inconvenience and expense of carrying out the same and because there is great danger of cracking the glass unevenly or along the body thereof. Another common method of performing this operation is to rotate the glass article between or within a plurality of gas-jets; but this is also objectionable, for the reason that any inequalities in the glass will during the rotation thereof present themselves to all parts of the flame, and if the inequality be on the base it will cause the glass article to rest unevenly upon its rotating support, the result in both cases being that the glass will be unevenly severed or entirely destroyed.

My invention resides in an apparatus for severing glass which overcomes the objections to these prior devices; and it consists in a rotating burner or burners within which the glass article to be cracked and severed is introduced.

It also consists in novel means for elevating the glass-holder for the purpose of introducing the article into the flame within the burners.

The invention also consists in certain features and details of construction and combinations of parts, which will be more fully hereinafter described and claimed.

In the drawings forming part of this specification, Figure 1 is a vertical sectional view illustrative of my invention. Fig. 2 is a plan view of the burners. Fig. 3 is a sectional plan view of the bracket provided with the tubular extension on which the rotating burner-support is mounted. Fig. 4 is a detail plan view showing the means for elevating the glass-holder, and Fig. 5 is a sectional side elevation of the same.

Like reference-numerals indicate like parts in the different views.

The table or support 1 has secured thereto and extending upwardly therefrom the uprights 2, to the upper ends of which is secured a horizontal plate 3, having a bearing-boss 4 thereon. Also secured to the table 1, at one end thereof, is a standard 5, to which is adjustably secured the bracket 6, the said bracket being locked thereto by its engagement with a shoulder on said standard and a nut 7. The bracket 6 is formed with a tubular extension 8, whose inner walls are cylindrical and form a passage extending entirely through said bracket 6. The outer walls of the extension 8 are tapering from the lower end upwardly, and in the opposite sides of said bracket 6 and the tubular extension 8 are formed the ducts 9 and 10 for the admission of gas and air, respectively. A gas-supply pipe 11 communicates with the duct 9, and an air-supply pipe 12 communicates with the duct 10. The ducts 9 and 10 communicate with or merge into at their upper ends an annular groove or channel 13, which is disposed in a horizontal plane and is formed in the outer surface of the tubular extension 8 of the bracket 6. Surrounding the extension 8 of the bracket 6 is a rotatable burner-support 14, the same comprising a sleeve 15, whose inner walls are tapering and lie in close contact with the outer surface of the extension 8, a pulley 16, secured to or formed integral with said sleeve at its lower end, a horizontal outwardly-extending annular top plate 17, and an upwardly-extending annular flange 18 around the edge of the top 17. All of these parts are shown as being integral, although it is obvious that they may be formed in separate pieces, if desired. Resting upon the top plate 17 of the burner-support 14 and lying within the annular flange 18 are two burners 19 20. Each of these burners is made in two parts, the lower part 21 being dished out or recessed in its upper face, as shown, and the upper part 22 being secured thereto, so as to form an orifice 23 around the inner edge of the burner, through which gas or vapor may issue in a thin stream. I have illustrated in the drawings two burners 19 20; but it is obvious that a greater number than two may be employed, if desired, or I may, in fact, dispense with the separating-partitions 24 at the ends of each burner and form the same as a single annular burner having a single discharge-orifice 23 around its inner edge. The discharge-orifices 23 of the different burners when two or more are employed are unitedly circular in cross-section, the diameter of the space within said orifices being substantially the same as the inner diameter of the tubular extension 8 of the bracket 6. Removably secured to the flange 18 of the burner-support 14 and extending into the burners 19 20 are nozzles or injectors 25 26. The nozzle 25 is connected by a pipe 27 to a coupling-pipe 28, communicating with the groove or channel 13 on one side, and the pipe 29 connects the nozzle 26 with a pipe 30, communicating with the channel 13 on the opposite side of the machine. In each of the pipes 27 29 is a controlling-valve or cut-off 31.

Located within the space inclosed by the tubular extension 8 of the bracket 6 is a glass-holder 32, the same being supported upon the upper end of a rod or shaft 33, extending down through the boss 4 on the plate 3 and having secured thereto an adjustable collar 34. Engaging the under side of the collar 34 is a cross-bar 35, whose ends extend out beyond the uprights 2. Each end of the cross-bar 35 rests upon a horizontally-movable triangular elevating-block 36, having a handle 37 thereon, by which it may be moved out or in. The upper surface of the block 36 preferably lies in a horizontal plane, whereas the lower surface thereof is inclined. The block 36 rests and is adapted to move upon a second inclined stationary block 38, supported upon the table or support 1 and having an inclined upper surface. The blocks 36 at opposite ends of the cross-bar 35 are connected together, so as to be operated in unison, and the handle 37 is common to both. By this construction it will be observed that when the blocks 36 are in their extreme outermost positions the shaft 33 and the glass-holder 32 on the upper end thereof are in their lowermost positions. By forcing the blocks 36 inwardly, however, the inclined surfaces thereof riding over the inclined surfaces of the blocks 38 are thereby elevated, and through their engagement with the under side of the cross-bar 35, which itself engages the collar 34, the shaft 33 and the glass-holder 32 thereon are raised. A reverse or outward movement of the blocks 36 will cause the shaft 33 and the glass-holder 32 thereon to be lowered by gravity. By adjusting the position of the collar 34 on the shaft 33 the extent of the upward movement of the shaft 33 may be controlled.

In using my device the burner-support 14, carrying the burners 19 and 20 and the pipe connections with said burners, is caused to rotate by the application of power thereto from any suitable source through the pulley 16. Gas is supplied to the groove or channel 13 in the tubular extension 8 of the bracket 6 through the pipe 11 and duct 9. Air is also supplied to said groove or channel 13 through the pipe 12 and the duct 10. The said groove or channel 13 therefore serves as a mixing-chamber for the air and gas. From this mixing-chamber the air and gas are supplied through the pipes 28 and 27 and the nozzle 25 to the burner 19 and through the pipes 30 and 29 and nozzle 26 to the burner 20. The same is ignited along the discharge-orifices 23 of said burners and burns in the form of a thin annular flame around the space above the extension 8. The supply of air and gas to the burners 19 and 20 can of course be controlled by the cocks 31. A glass article 39, the upper end of which is to be severed from the lower, is now placed upon the glass-holder 32 and said holder is elevated, so as to bring the article 39 within the annular jet of flame issuing from the orifices 23 by raising the shaft 33, to which the holder 32 is connected. This is done, as heretofore stated, by forcing inwardly the triangular blocks 36. The narrow jet of flame striking against the article 39 along the line around which it is to be severed cracks the glass along this line and separates the two parts of the same smoothly and evenly. There is no danger whatever by my construction of the crack extending down into the body of the glass article; but, on the other hand, the severing is clean and complete along the line desired.

I have described the groove or channel 13 as a mixing-chamber for the air and gas admitted thereto through pipe 11 and duct 9 and pipe 12 and duct 10. It is obvious, however, that the air and gas may be mixed prior to their entrance into the channel 13, or gas or vapor alone may be supplied to said channel. In such case both of the pipes 11 and 12 will lead from a source of gas or vapor or from a mixing-chamber for gas and vapor, or, indeed, one of the pipes 11 or 12, with its corresponding duct in the bracket 6, may be altogether dispensed with.

Having now described my invention, what I claim as new, and desire to secure by Letters Patent, is—

1. In an apparatus for severing articles of glassware, a rotating burner, and means for feeding the articles to be treated thereto.

2. In an apparatus for severing articles of glassware, a burner having an annular discharge-orifice, means for rotating said burner, and means for feeding the articles to be treated into the space within said burner.

3. In an apparatus for severing articles of glassware, a plurality of burners, means for rotating said burners, and means for feeding the articles to be treated to the space between said burners.

4. In an apparatus for severing articles of glassware, a plurality of burners having segmental discharge-orifices, means for rotating said burners, and means for feeding the articles to be treated to the space within said burners.

5. In an apparatus for severing articles of glassware, a burner, a rotary support therefor, and means for feeding the articles to be treated to said burner.

6. In an apparatus for severing articles of glassware, a burner, a rotary support therefor, a pipe for supplying fuel to said burner, carried by said support, communicating at one end with said burner and at its other end with a stationary source of supply, and means for feeding the articles to be treated to said burner.

7. In an apparatus for severing articles of glassware, a burner, a rotary support therefor, fuel-conveying pipes carried by said support, a stationary part on which said burner-support is mounted having an annular groove therein with which one end of each of said pipes communicates, supply-pipes for air and gas communicating with said channel, and means for feeding the articles to be treated to said burner.

8. In an apparatus for severing articles of glassware, a bracket having a tubular extension therein provided with an annular groove in its outer surface, a burner-support mounted to turn on said extension and provided with means for rotating it, a burner carried by said support, a pipe extending through said support communicating with said annular groove and with said burner, means for supplying fuel to said groove, and means for feeding the articles to be treated to said burner.

9. In an apparatus for severing articles of glassware, a bracket having a tubular extension thereon provided with an annular groove in its outer surface communicating with a source of fuel-supply, a burner-support mounted to turn on said extension, the said support comprising a sleeve lying in close contact with said extension, a pulley on said sleeve, an annular top plate at the upper end of said sleeve, and an annular flange extending around said top plate, a burner resting upon said top plate and lying within said flange, a pipe communicating with said burner at one end and with said annular groove at the other end, and means inside said tubular extension for feeding the articles to be treated to said burner.

10. In an apparatus for severing articles of glassware, a burner, a vertically-movable glass-holder, and a block or wedge having inclined surfaces for raising and lowering said holder, the said block being horizontally movable and operatively connected with said holder.

11. In an apparatus for severing articles of glassware, a burner, a vertically-movable glass-holder, a cross-bar connected with said holder, and a block or wedge having inclined surfaces for raising and lowering said holder, the said block or wedge being horizontally movable and engaging the under side of said cross-bar.

12. In an apparatus for severing articles of glassware, a burner, a vertically-movable glass-holder, a cross-bar connected with said glass-holder, and a pair of blocks or wedges having inclined surfaces, the said blocks or wedges being connected together so as to be operated in unison, being horizontally movable and engaging the under side of said cross-bar at points removed from each other.

13. In an apparatus for severing articles of glassware, a burner, a vertically-movable glass-holder and a pair of blocks or wedges having inclined surfaces for raising and lowering said holder, one of said blocks being stationary with its inclined surface uppermost and the other of said blocks being horizontally movable, operatively connected with said holder and having its inclined surface bearing against the inclined surface of the stationary block.

14. In an apparatus for severing articles of glassware, a burner, a glass-holder, a vertically-movable rod or shaft to which said holder is connected, a cross-bar connected with said rod or shaft, and two pairs of blocks or wedges having inclined surfaces for raising and lowering said holder, one pair being located at each end of said cross-bar, one member of each pair being stationary and having its inclined surface uppermost and the other member of each pair being horizontally movable, engaging the under side of said cross-bar and having its inclined surface in contact with the inclined surface of the stationary member.

In testimony whereof I have hereunto set my hand in presence of two subscribing witnesses.

ANTON ROEMISCH.

Witnesses:
J. E. FLEMING,
E. G. DONLEY.